US012326125B2

(12) United States Patent
Uchibori et al.

(10) Patent No.: US 12,326,125 B2
(45) Date of Patent: Jun. 10, 2025

(54) ENGINE DEVICE

(71) Applicant: YANMAR HOLDINGS CO., LTD., Osaka (JP)

(72) Inventors: Masataka Uchibori, Osaka (JP); Hiroaki Naganawa, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/546,876

(22) PCT Filed: Mar. 16, 2022

(86) PCT No.: PCT/JP2022/011845
§ 371 (c)(1),
(2) Date: Aug. 17, 2023

(87) PCT Pub. No.: WO2022/196722
PCT Pub. Date: Sep. 22, 2022

(65) Prior Publication Data

US 2024/0133353 A1 Apr. 25, 2024
US 2024/0229747 A9 Jul. 11, 2024

(30) Foreign Application Priority Data

Mar. 18, 2021 (JP) ................................. 2021-044758

(51) Int. Cl.
*F02M 26/23* (2016.01)
*F02M 26/30* (2016.01)

(52) U.S. Cl.
CPC ............ *F02M 26/23* (2016.02); *F02M 26/30* (2016.02)

(58) Field of Classification Search
CPC ................................ F02M 26/23; F02M 26/30
See application file for complete search history.

(56) References Cited

U.S. PATENT DOCUMENTS 10,221,815 B1 * 3/2019 Jin .......................... F16K 11/02
2013/0206120 A1 8/2013 Yoshida et al.
(Continued)

FOREIGN PATENT DOCUMENTS

EP 2799683 A1 * 11/2014 ............. B60K 13/04
JP H0742628 A * 2/1995
(Continued)

OTHER PUBLICATIONS

International Search Report for PCT Patent App. No. PCT/JP2022/011845 (May 31, 2022).
(Continued)

*Primary Examiner* — Ngoc T Nguyen
(74) *Attorney, Agent, or Firm* — Future IP LLC; Tomoko Nakajima

(57) ABSTRACT

Provided is an engine device for which an increase in width can be suppressed due to the size of an EGR cooler. The engine device comprises: a cylinder block; a cylinder head; an exhaust manifold; and an EGR cooler. The cylinder head is disposed above the cylinder block. The exhaust manifold is disposed on one side surface of the cylinder head and circulates exhaust gas exhausted from the cylinder head. The EGR cooler is disposed below the exhaust manifold and cools EGR gas constituting a portion of the exhaust gas exhausted from the exhaust manifold.

12 Claims, 9 Drawing Sheets

(56) References Cited

U.S. PATENT DOCUMENTS

| | | | | |
|---|---|---|---|---|
| 2016/0290211 | A1 | 10/2016 | Mitsuda et al. | |
| 2018/0291844 | A1 | 10/2018 | Lee et al. | |
| 2020/0003107 | A1 | 1/2020 | Onodera | |
| 2020/0362776 | A1 * | 11/2020 | Matsui | F02M 26/26 |

FOREIGN PATENT DOCUMENTS

| | | | | | |
|---|---|---|---|---|---|
| JP | 2005036714 | A | * | 2/2005 | |
| JP | 2009108704 | A | | 5/2009 | |
| JP | 2016169836 | A | * | 9/2016 | |
| JP | 201825152 | A | | 2/2018 | |
| JP | 2018-123718 | A | | 8/2018 | |
| JP | 2019-108831 | A | | 7/2019 | |
| WO | WO2010/092857 | A1 | | 8/2010 | |
| WO | WO2012/056885 | A1 | | 5/2012 | |
| WO | WO2015/076338 | A1 | | 5/2015 | |
| WO | WO-2016175716 | A1 | * | 11/2016 | F02M 26/29 |
| WO | WO-2021182075 | A1 | * | 9/2021 | F02M 26/12 |

OTHER PUBLICATIONS

Japanese Decision to Grant a Patent for Application No. 2020-010421 (issued on Jun. 14, 2023) with English language translation thereof.

Japanese Decision to Grant a Patent for Application No. 2020-010421 (issued on Nov. 21, 2023) with English language translation thereof.

* cited by examiner

ENGINE DEVICE

This application is a national phase entry under 35 U.S.C. § 371 of PCT Patent Application No. PCT/JP2022/011845, filed Mar. 16, 2022, which claims priority under 35 U.S.C. § 119 to Japanese Patent Application No. 2021-044758, filed Mar. 18, 2021, all of which are incorporated by reference.

TECHNICAL FIELD

The present invention relates to an engine device.

BACKGROUND ART

Patent Literature 1 discloses an engine device. The engine device of Patent Literature 1 is equipped with a cylinder head and an Exhaust Gas Recirculation (EGR) cooler. The EGR cooler is connected to a front side surface of a cylinder head (a flywheel side surface). In the engine device of Patent Literature 1, an EGR gas flow path is formed in s cylinder head that communicates with the EGR cooler.

CITATION LIST

Patent Literature

Patent Literature 1: Japanese Patent Laid-open Publication No. 2018-123718

DISCLOSURE OF INVENTION

Problems to be Solved by the Invention

However, in the configuration where the EGR cooler is connected to the front side surface of the cylinder head, when the longitudinal width of the EGR cooler is larger than the lateral width of the cylinder head, the width of the engine device increases, so that mountability of the engine device when being mounted on a work machine is impaired. For example, in the case of an engine device with high power, the longitudinal width of the EGR cooler may be larger than the width of the cylinder head because the EGR cooler increases in size.

The present invention has been made in view of the above mentioned problem, therefore an object of the present invention is to provide an engine device capable of suppressing the increase in its lateral width due to the size of the EGR cooler.

Means for Solving the Problems

In the present invention, the engine device includes a cylinder block, a cylinder head, an exhaust manifold, and an EGR cooler. The cylinder head is located above the cylinder block. The exhaust manifold is located on one side surface of the cylinder head and distributes exhaust gases exhausted from the cylinder head. The EGR cooler is located below the exhaust manifold and cools the EGR gas, which is part of the exhaust gas exhausted from the exhaust manifold.

Effect of the Invention

According to the engine device of the present invention, it is possible to suppress the increase in the lateral width of the engine device due to the size of the EGR cooler.

BRIEF DESCRIPTION OF DRAWINGS

FIG. 5(*b*) is another perspective view showing the exhaust manifold, the EGR cooler, the cylinder head, the EGR gas pipe, the EGR valve, and the intake manifold.

FIG. 8(*b*) is a right side view of the exhaust manifold.

FIG. 9(*b*) is another perspective view of the EGR cooler.

DESCRIPTION OF EMBODIMENTS

Figure 1:
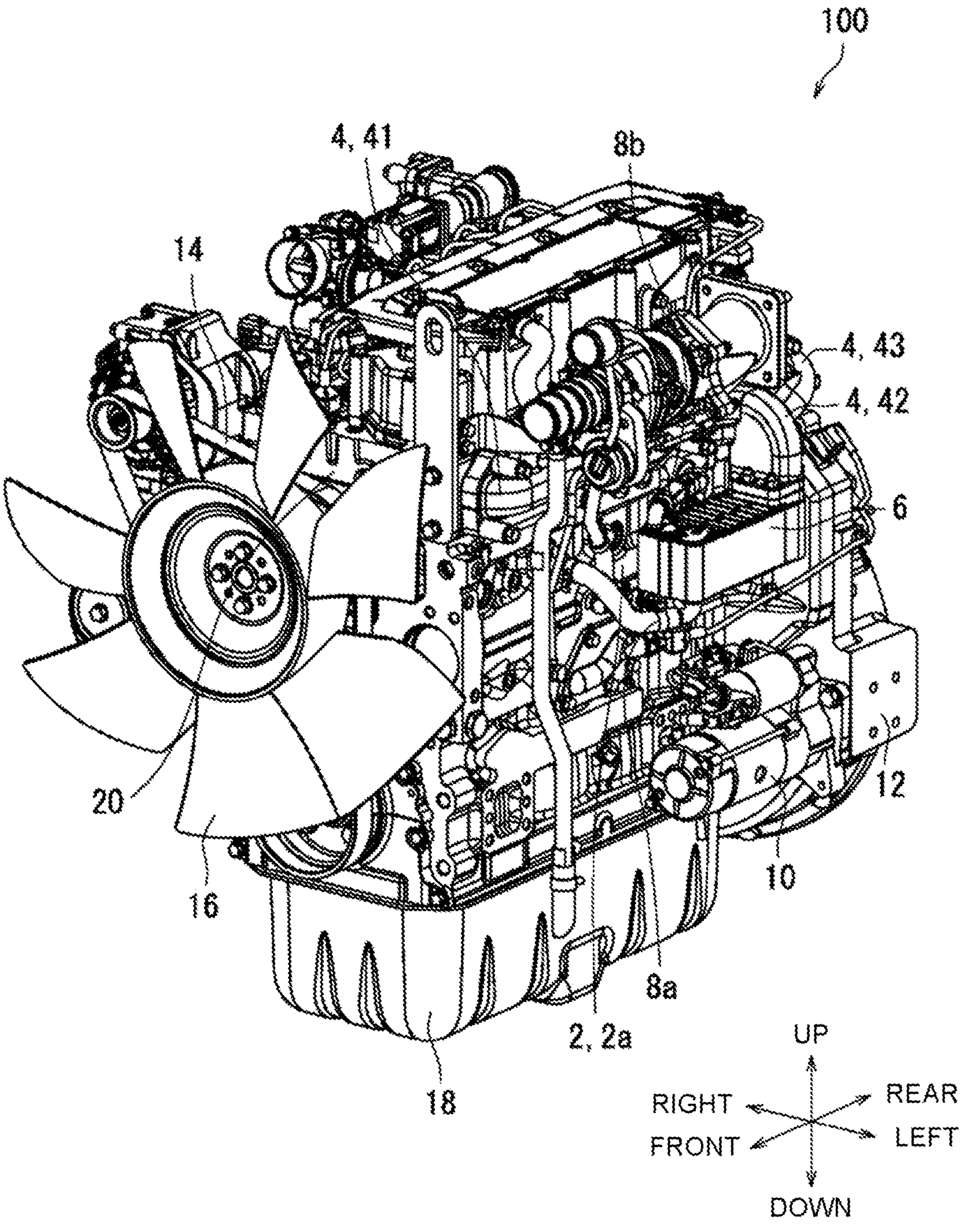
FIG. 1 is a perspective view illustrating an engine device according to an embodiment of the present invention.

The following is a description of an engine device according to an embodiment of the present invention with reference to the drawings (FIGS. 1 to 9(*b*)). However, the present invention is not limited to the embodiment described below, and can be carried out in various modes within the range not departing from the gist of the present invention. It is noted that description of overlapping sections may be omitted as appropriate. It is also noted that in the drawings, a same reference numeral is applied to a same or corresponding portion and description thereof is not repeated.

For the purpose of easy understanding, a front-rear direction, a left-right direction, and an up-down direction are defined in the specification. In the present embodiment, a side where a cooling fan 16 (see FIG. 1) is located is defined as a front side of the engine device 100, and a side where a flywheel 26 (see FIG. 4) is located is defined as a rear side of the engine device 100. A side where the exhaust manifold 4 (see FIG. 1) is located is defined as a left side of the engine device 100, and a side where an intake manifold 32 (see FIG. 5) is located is defined as the right side of the engine device 100. In other words, an exhaust side of the engine device 100 is the left side of the engine device 100, and an intake side of the engine device 100 is the right side of the engine device 100. The side where an oil pan 18 (see FIG. 1) is located is defined as a down side of the engine device 100, and the side where a cylinder head 20 (see FIG. 1) is located is defined as an up side of the engine device 100. However, the front-rear direction, the left-right direction, and the up-down direction are defined only for convenience of description, and are not intended to limit directions of the engine device of the present invention in use and in assembling by the definitions of these directions.

FIG. 1 is a perspective view illustrating an engine device 100 according to the present embodiment. The engine device 100 is mounted on a work machine such as an agricultural machine, a construction machine, and a civil engineering machine, for example. The engine device 100 is used as a power source for power to cause the work machine to travel. The engine device 100 is also used as a power source for a sort of auxiliary equipment. The sort of auxiliary equipment includes a compressor for an air conditioner and a compressor for rear car brakes installed in a tractor, for example. The air conditioner, for example, supplies at least one of cold and hot air to the space inside a cabinet of the tractor.

As shown in FIG. 1, the engine device 100 includes a cylinder block 2, an exhaust manifold 4, an Exhaust Gas Recirculation (EGR) cooler 6, a first cooling water pipe 8*a*, a second cooling water pipe 8*b*, a starter 10, a flywheel housing 12, a belt member 14, a cooling fan 16, an oil pan 18, and a cylinder head 20.

The oil pan 18 is located below the cylinder block 2. Lubricating oil is stored in the oil pan 18. The lubricating oil in the oil pan 18 is supplied to each lubricating section of the engine device 100. The lubricating oil supplied to each lubricating section is then returned to the oil pan 18.

The flywheel housing 12 is placed on in the rear of the cylinder block 2. The flywheel housing 12 houses the flywheel 26 (see FIG. 4). The starter 10 is attached to the flywheel housing 12 on the left side (exhaust side) of the cylinder block 2. The starter 10 transmits rotational power to the flywheel 26 when the engine is started.

The cylinder block 2 incorporates a plurality of cylinders and a plurality of pistons. Fuel is combusted by the plurality of pistons making a piston motion in each of the plurality of cylinders. As a result, power is generated in cylinder block 2.

Exhaust gases generated by fuel combustion flow into the exhaust manifold 4 through the cylinder head 20. The exhaust manifold 4 collects the exhaust gases from the cylinder head 20 and distributes the same. The exhaust manifold 4 is placed on the left side (exhaust side) of the cylinder head 20.

The EGR cooler 6 is located below the exhaust manifold 4. Therefore, the EGR cooler 6 is located on the left side (exhaust side) of the engine device 100. More specifically, the EGR cooler 6 is located at a left side (exhaust side) surface 2*a* of the cylinder block 2. Hereinafter, the left side surface 2*a* of the cylinder block 2 may be referred to as "left side surface 2*a*".

According to the present embodiment, the EGR cooler 6 is located at the left side surface 2*a* (exhaust side surface) of the cylinder block 2, so that even if the longitudinal width (width in the front-rear direction) of the EGR cooler 6 increases, the lateral width (width in the left-right direction) of the engine device 100 does not increase. According to this configuration, the EGR cooler 6 is located below the exhaust manifold 4, so that the EGR cooler 6 overlaps the exhaust manifold 4 as viewed from the side of the exhaust manifold 4 (upper side). Therefore, the lateral width (width in the left-right direction) of the engine device 100 becomes hard to be increased due to the lateral width (left-right direction width) of the EGR cooler 6. As a result, the increase in the lateral width (width in the left-right direction) of the engine device 100 is suppressed. Thus, the engine device 100 can be easily mounted on the work machine.

The EGR cooler 6 cools EGR gas which is part of exhaust gas exhausted from the exhaust manifold 4. Specifically, a first cooling water pipe 8*a* and a second cooling water pipe 8*b* are connected to the EGR cooler 6. The EGR cooler 6 has inside a gas flow path through which EGR gas is distributed and a cooling water flow path through which cooling water is distributed. The first cooling water pipe 8*a* communicates with an inlet of the cooling water flow path of the EGR cooler 6 (cooling water inlet), and the second cooling water pipe 8*b* communicates with an outlet of the cooling water flow path of the EGR cooler 6 (cooling water outlet). As EGR gas flows through the gas flow path of the EGR cooler 6, it is cooled by cooling water flowing through the cooling water flow path of the EGR cooler 6.

In the present embodiment, the gas flow path and the cooling water flow path of the EGR cooler 6 are U-shaped flow paths. Therefore, the EGR cooler 6 has a shorter longitudinal width (width in the front-back direction) than a configuration in which the gas flow path and the cooling water flow path are linear flow paths.

In the present embodiment, the EGR cooler 6 is located above the starter 10. Furthermore, the EGR cooler 6 is positioned so that its longitudinal direction is along the front-rear direction. Therefore, space to locate a sort of auxiliary equipment can be secured between the EGR cooler 6 and the starter 10. Power is transmitted from the flywheel 26 (see FIG. 4) to a sort of auxiliary equipment located between the EGR cooler 6 and the starter 10.

In the present embodiment, the EGR cooler 6 is attached to the exhaust manifold 4. Specifically, the exhaust manifold 4 has a body 41, a flange 42, and a pipe section 43. The flange 42 and the pipe section 43 are located on the side of the flywheel housing 12 (rear side). The EGR cooler 6 is attached to the flange 42 of the exhaust manifold 4. In detail, the flange 42 of the exhaust manifold 4 is connected to the upper surface of the EGR cooler 6.

EGR gas flows into the EGR cooler 6 through the flange 42 of the exhaust manifold 4. After being cooled by the EGR cooler 6, EGR gas is returned to the intake side of the engine device 100 through the flange 42 and the pipe section 43 of the exhaust manifold 4. Hereinafter, EGR gas after being cooled by the EGR cooler 6 may be referred to as "EGR gas after being cooled".

According to the present embodiment, since the EGR cooler 6 is attached to the exhaust manifold 4, no pipe to distribute EGR gas from the exhaust manifold 4 to the EGR cooler 6 is necessary. Thus, the number of parts in the engine device 100 can be reduced. As a result, man-hours required to assemble the engine device 100 can be reduced. In addition, gas leak is less likely to occur in the engine device 100 because the number of piping is reduced.

According to the present embodiment, the EGR cooler 6 is attached to the exhaust manifold 4, thereby bringing the EGR cooler 6 close to the exhaust manifold 4. As a result, more space to locate a sort of auxiliary equipment can be secured between the EGR cooler 6 and the starter 10.

In the present embodiment, a center of the EGR cooler 6 in the front-rear direction is located on a side nearer the flywheel housing 12 (rear side) than a center of the cylinder block 2 in the front-rear direction. Therefore, space to locate a sort of auxiliary equipment can be secured in front of the EGR cooler 6 (the side of the cooling fan 16). Furthermore, as already explained, because the gas flow path and the cooling water flow path in the EGR cooler 6 are U-shaped flow paths, the EGR cooler 6 has a shorter longitudinal width (width in the front-rear direction) than the configuration in which the gas flow path and the cooling water flow path are linear flow paths. Therefore, more space to locate a sort of auxiliary equipment can be secured in front of the EGR cooler 6 (the side of the cooling fan 16). Power from the belt member 14 is transmitted to the sort of auxiliary equipment located in front of the EGR cooler 6.

According to the present embodiment, since the EGR cooler 6 is attached to the exhaust manifold 4, more space to locate a sort of auxiliary equipment can be secured in front of the EGR cooler 6 (on the side of the cooling fan 16).

In the present embodiment, the EGR cooler 6 overlaps the flywheel housing 12 in its entirety as viewed from the side of the flywheel housing 12. In other words, the EGR cooler 6 is located more inside than the flywheel housing 12 in the left-right direction. Therefore, the lateral width (width in the left-right direction) of the engine device 100 can be suppressed from increasing due to the lateral width (width in the left-right direction) of the EGR cooler 6. Also, when the engine device 100 is mounted on a work machine, interference between the engine device 100 and parts of the work machine located around the engine device 100 can be suppressed.

Figure 2:
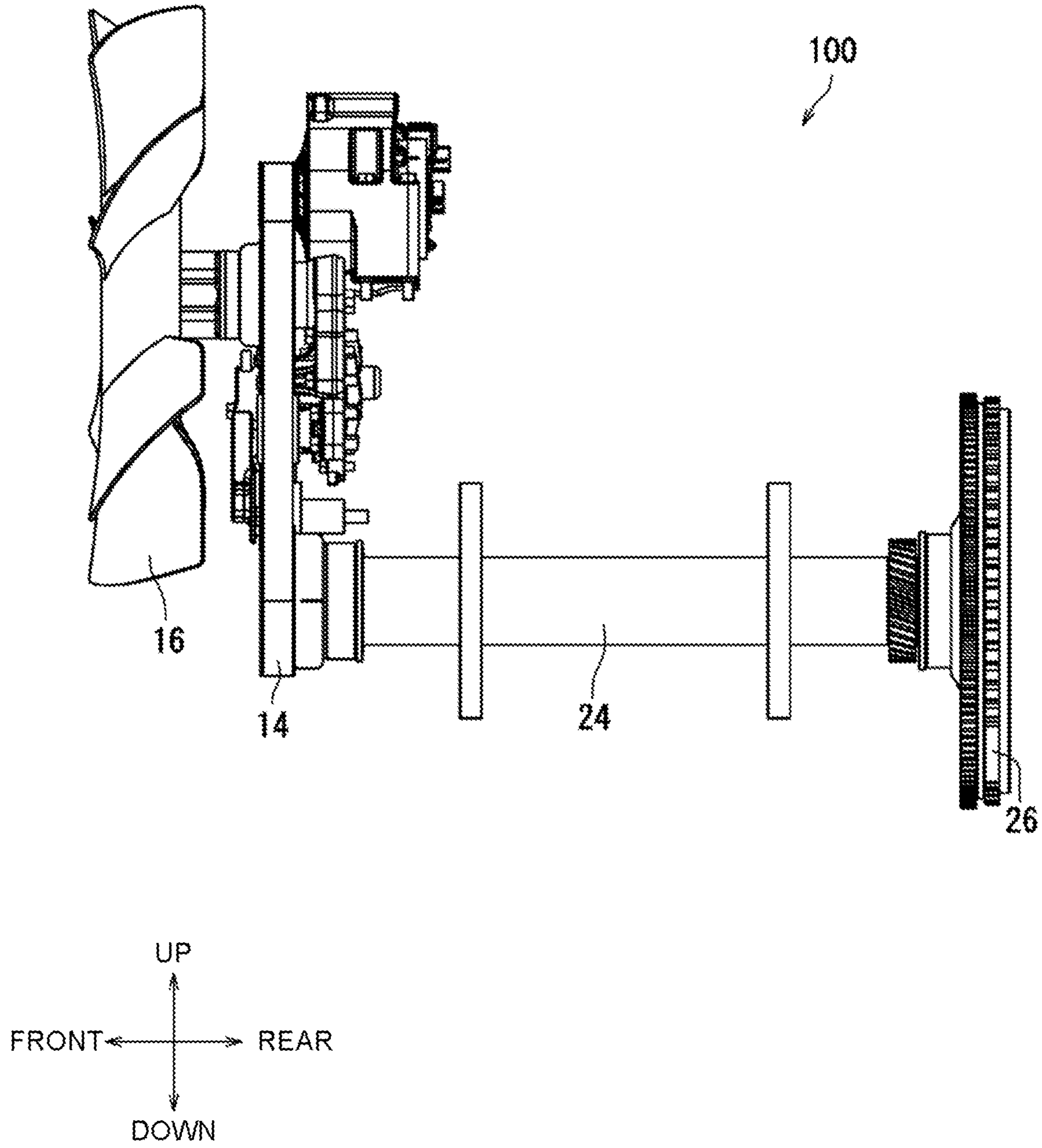
FIG. 2 is a left side view showing a belt member, a cooling fan, a crankshaft, and a flywheel.

Next, the engine device 100 according to the present embodiment is described with reference to FIGS. 1 and 2. FIG. 2 is a left side view showing a belt member 14, a cooling fan 16, a crankshaft 24, and a flywheel 26.

As shown in FIG. 2, the engine device 100 further includes the crankshaft 24 and the flywheel 26. The flywheel 26 is connected to a rear end of the crankshaft 24.

The crankshaft 24 extends in the front-rear direction. The crankshaft 24 is rotatably supported by the cylinder block 2 described above with reference to FIG. 1. The crankshaft 24 passes through the cylinder block 2.

The crankshaft 24 rotates based on power generated in the cylinder block 2. The flywheel 26 rotates integrally with the crankshaft 24. The flywheel 26 provides the crankshaft 24 with inertia.

The belt member 14 rotates with power transmitted from the crankshaft 24. The cooling fan 16 rotates with power transmitted from the belt member 14. The cooling fan 16 cools cooling water.

Figure 3:
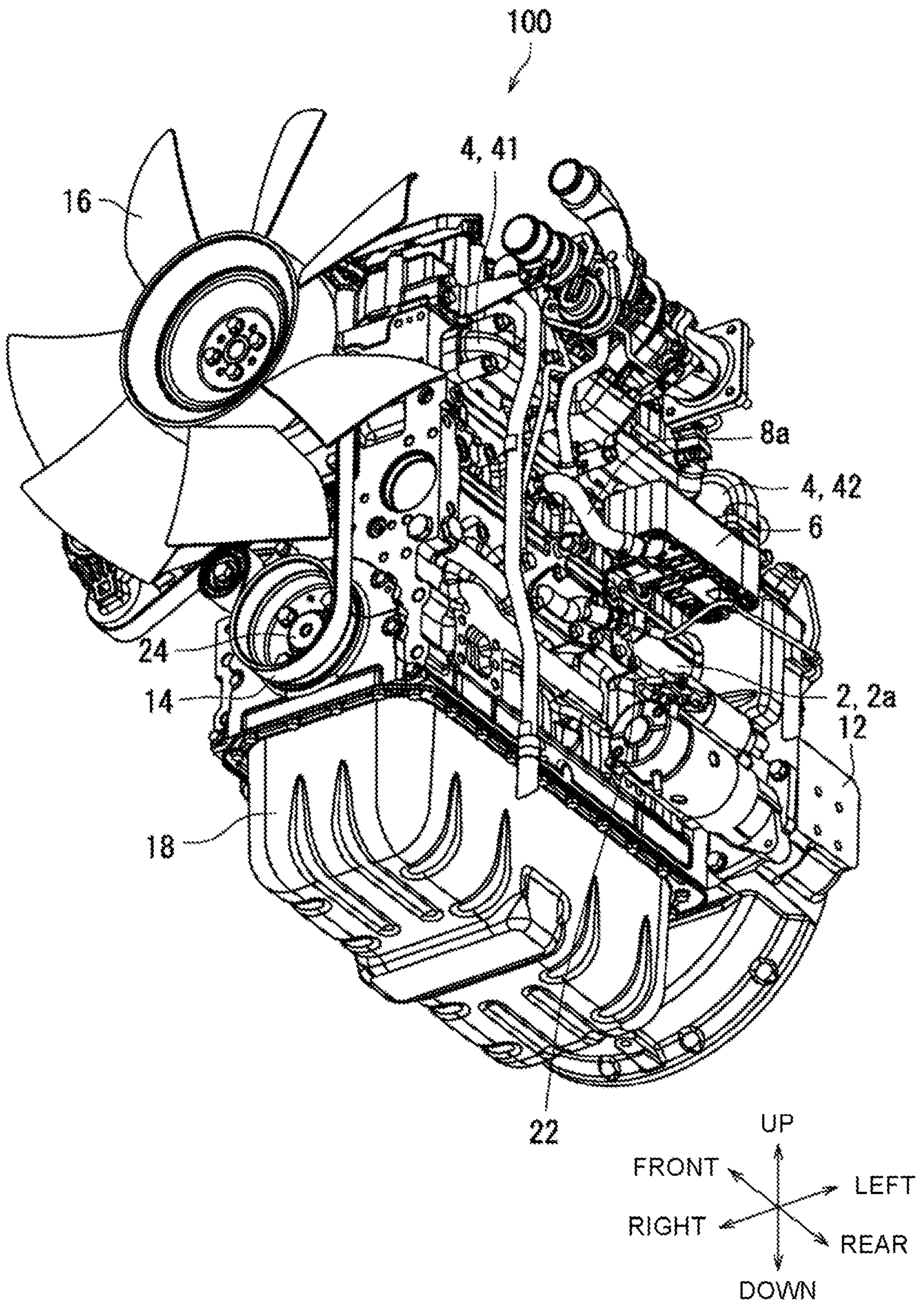
FIG. 3 is a perspective view of the engine device viewed from a different direction from FIG. 1.

Next, the engine device 100 according to the present embodiment is described with reference to FIG. 3. FIG. 3 is a perspective view of the engine device 100 as viewed from a different direction than FIG. 1. As shown in FIG. 3, the engine device 100 further includes a bracket 22.

The bracket 22 attaches the EGR cooler 6 to the left side surface 2*a* of the cylinder block 2. In the present embodiment, the bracket 22 is connected to a bottom surface of the EGR cooler 6.

According to the present embodiment, the bracket 22 allows a shake of the EGR cooler 6 due to engine vibration to be suppressed. The exhaust manifold 4 may also extend (thermal expansion) due to heat from exhaust gases. According to the present embodiment, the bracket 22 allows the stress applied to the EGR cooler 6 due to thermal expansion of the exhaust manifold 4 to be reduced.

Figure 4:
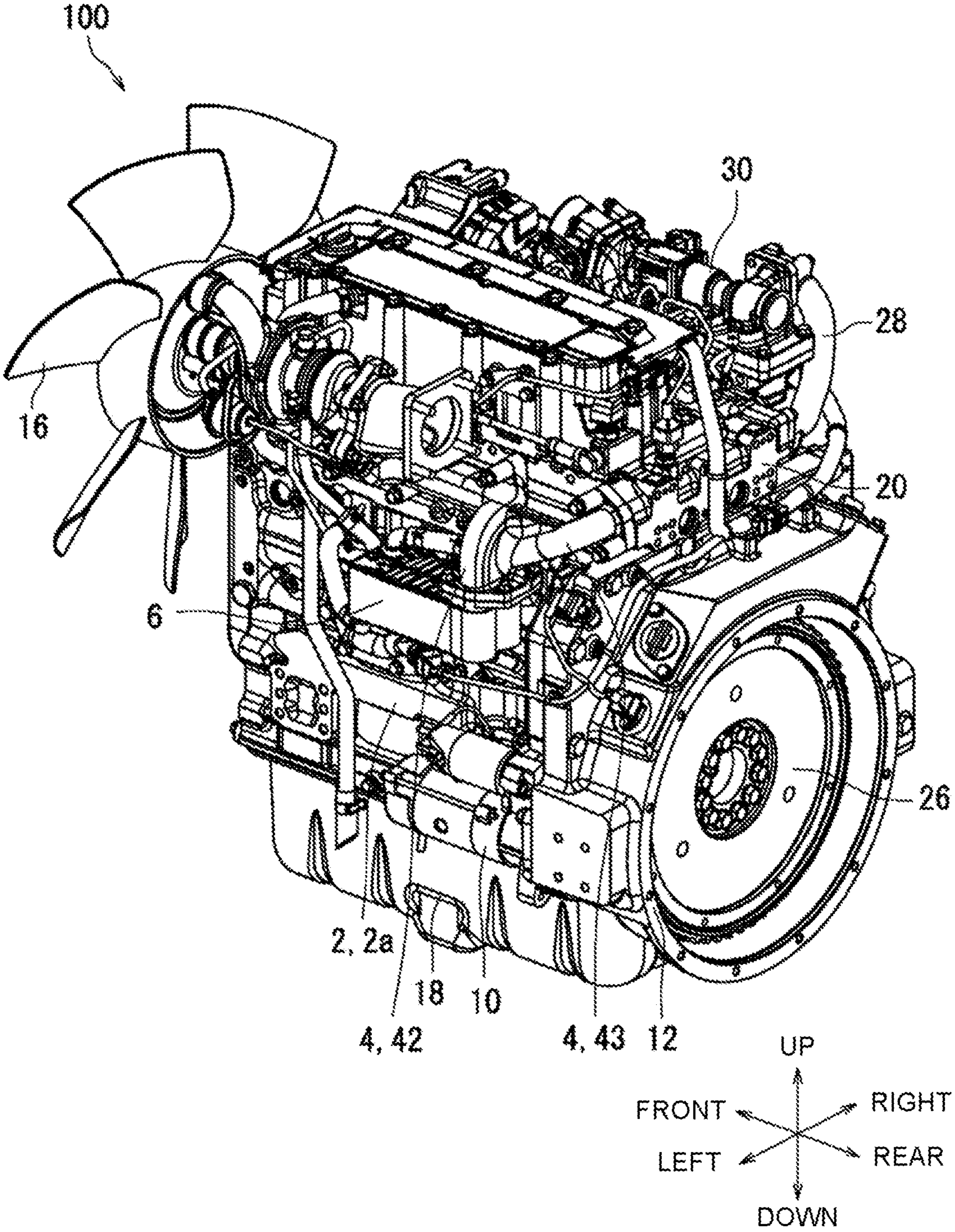
FIG. 4 is a perspective view of the engine device viewed from a different direction from FIGS. 1 and 3.

Next, the engine device 100 according to the present embodiment is described with reference to FIG. 4. FIG. 4 is a perspective view of the engine device 100 as viewed from a different direction from FIGS. 1 and 3. As shown in FIG. 4, the engine device 100 further includes an EGR gas pipe 28 and an EGR valve 30.

In the present embodiment, EGR gas after being cooled flows into the cylinder head 20 from the pipe section 43 of the exhaust manifold 4. The cylinder head 20 distributes EGR gas after being cooled to the EGR gas pipe 28. The EGR gas pipe 28 distributes EGR gas after being cooled to the EGR valve 30.

In the present embodiment, the EGR cooler 6 is located at a position adjacent to the flywheel housing 12. Therefore, more space to locate a sort of auxiliary equipment can be secured in front of the EGR cooler 6.

Figure 5A:
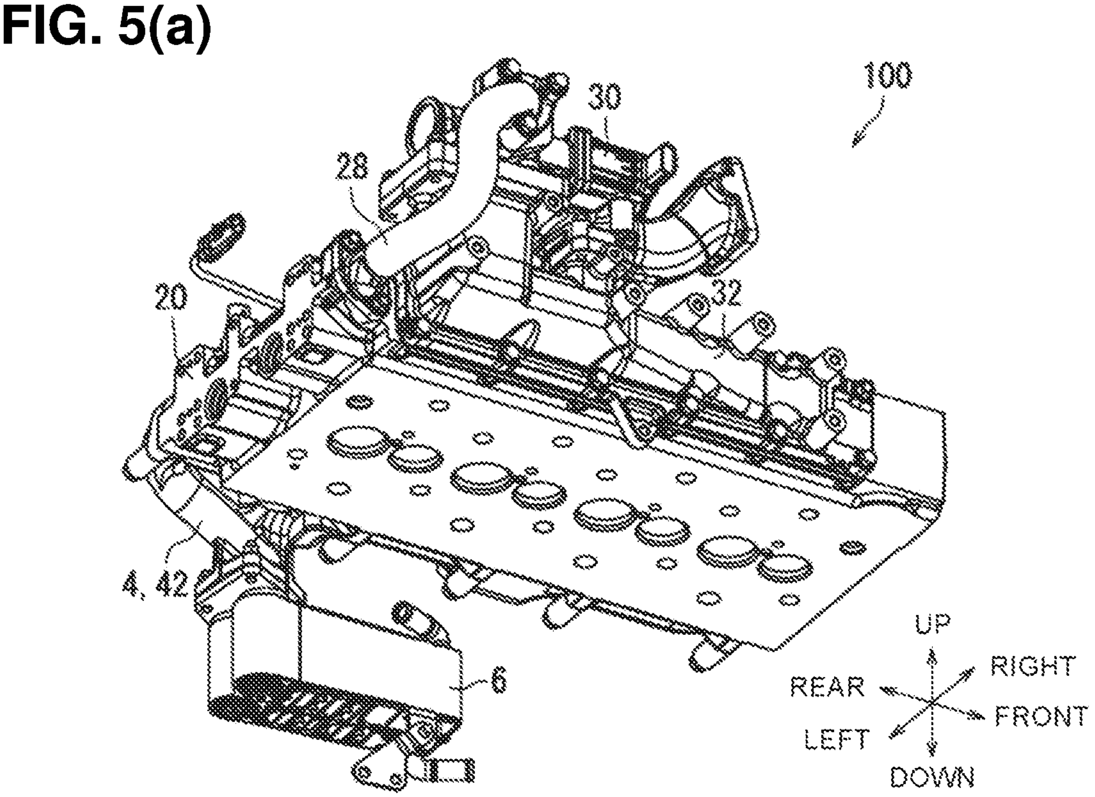
FIG. 5(*a*) is a perspective view showing an exhaust manifold, an EGR cooler, a cylinder head, an EGR gas pipe, an EGR valve, and an intake manifold.
Figure 5B:
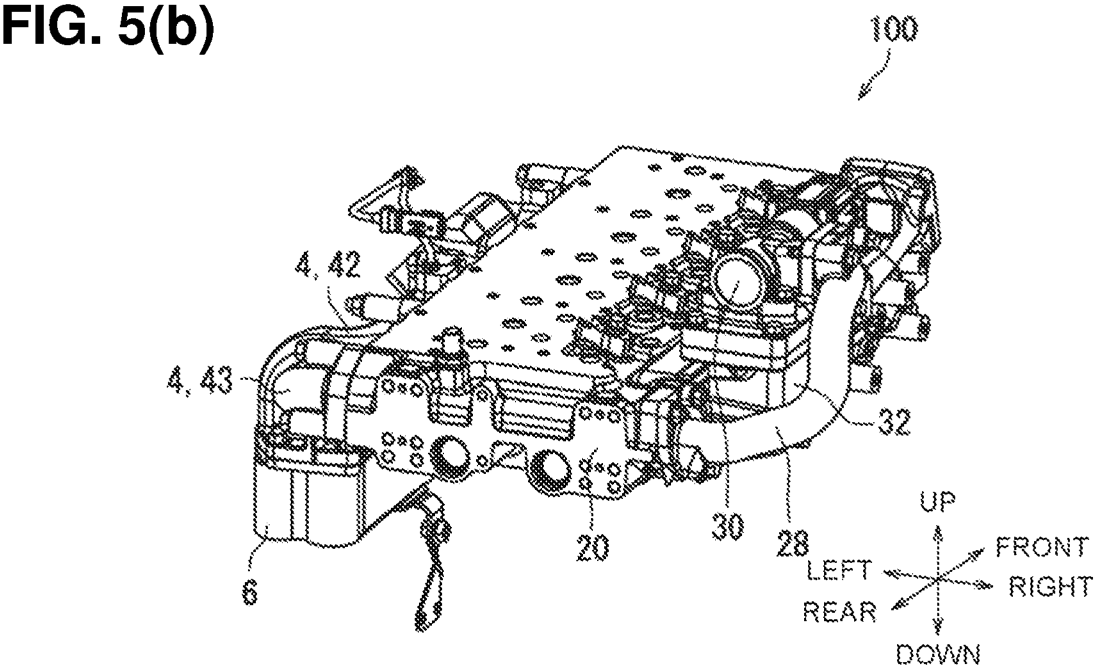

Next, the engine device 100 according to the present embodiment is described with reference to FIGS. 5(*a*) and 5(*b*). FIG. 5(*a*) is a perspective view showing the exhaust manifold 4, the EGR cooler 6, the cylinder head 20, the EGR gas pipe 28, the EGR valve 30, and an intake manifold 32. FIG. 5(*b*) is another perspective view showing the exhaust manifold 4, the EGR cooler 6, the cylinder head 20, the EGR gas pipe 28, the EGR valve 30, and the intake manifold 32.

As shown in FIGS. 5(*a*) and 5(*b*), the engine device 100 further includes the intake manifold 32. The EGR valve 30 distributes the EGR gas after being cooled to the intake manifold 32. The EGR valve 30 adjusts the amount of EGR gas after being cooled, which is to be supplied to the intake manifold 32.

The intake manifold 32 is placed on the right side (intake side) surface of the cylinder head 20. The intake manifold 32 aggregates the EGR gas after being cooled that flows into from the EGR valve 30 and fresh air to produce mixed gas and distributes the mixed gas to the cylinder head 20. The cylinder head 20 distributes the mixed gas that flows into from the intake manifold 32 to cylinder block 2.

Figure 6:
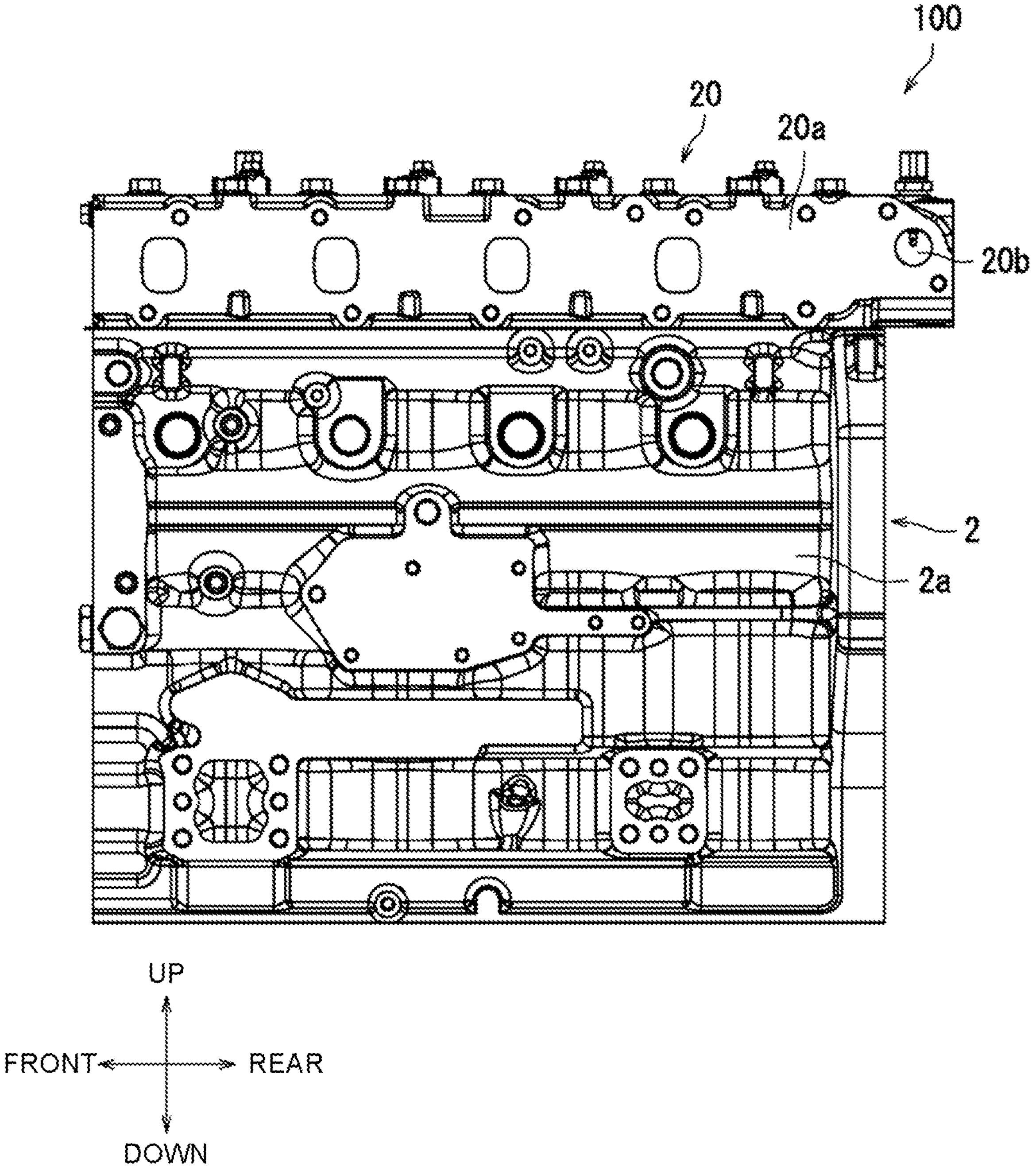
FIG. 6 is a left side view showing a cylinder block and a cylinder head.
Figure 7:
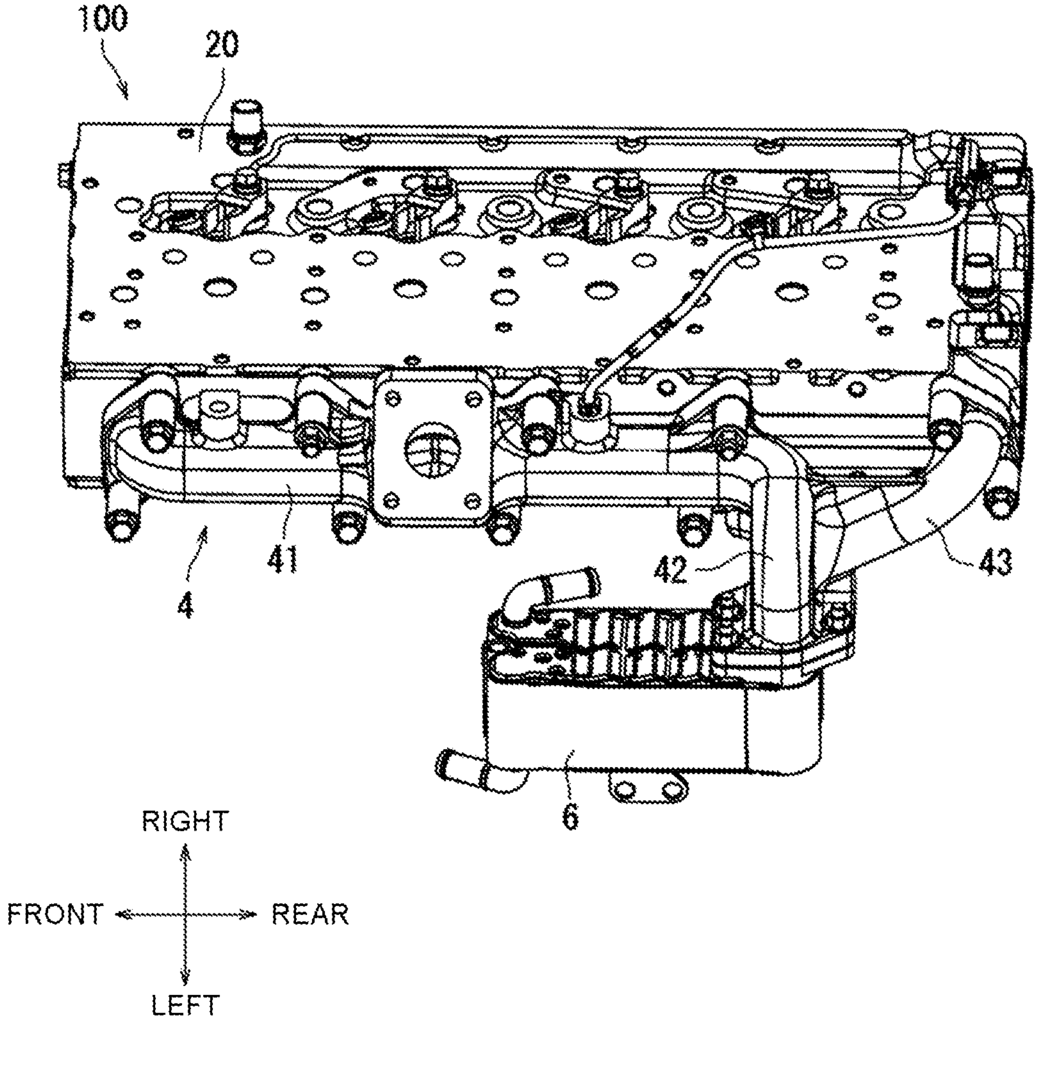
FIG. 7 is a perspective view showing the exhaust manifold, the EGR cooler, and the cylinder head.

Next, the engine device 100 according to the present embodiment is described with reference to FIGS. 6 and 7. FIG. 6 is a left side view showing the cylinder block 2 and the cylinder head 20. FIG. 7 is a perspective view showing the exhaust manifold 4, the EGR cooler 6, and the cylinder head 20.

As shown in FIG. 6, the cylinder head 20 has a gas flow path 20*b*. The gas flow path 20*b* is a through hole that passes through the cylinder head 20 in the left-right direction. The gas flow path 20*b* distributes the EGR gas after being cooled as described with reference to FIG. 1. The gas flow path 20*b* includes an EGR gas inlet (opening) formed on the left side (exhaust side) surface 20*a* of cylinder head 20. The gas flow path 20*b* includes an EGR gas outlet (opening) formed on the right side (intake side) surface of the cylinder head 20. In the following description, the left side (exhaust side) surface 20*a* of the cylinder head 20 may be referred to as "left side surface 20*a*".

As shown in FIG. 6, the cylinder head 20 is placed on the cylinder block 2. Specifically, the cylinder head 20 is connected to the top surface of the cylinder block 2. As shown in FIGS. 6 and 7, the exhaust manifold 4 is located on the left side surface 20*a* of the cylinder head 20. The cylinder head 20 distributes exhaust gases exhausted from the cylinder head 20 to the exhaust manifold 4.

As shown in FIG. 7, the pipe section 43 of the exhaust manifold 4 communicates with the EGR gas inlet of the gas flow path 20*b* described with reference to FIG. 6. The EGR gas outlet of the gas flow path 20*b* communicates with the EGR gas pipe 28 described with reference to FIGS. 4, 5(*a*), and 5(*b*).

Figure 8A:
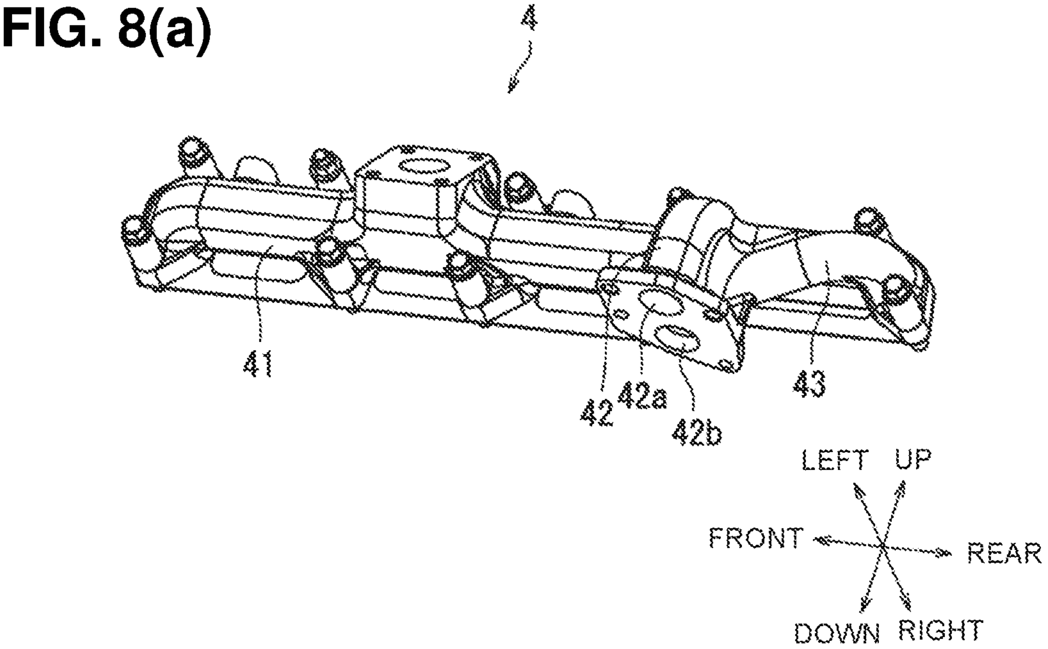
FIG. 8(*a*) is a perspective view showing the exhaust manifold.
Figure 8B:
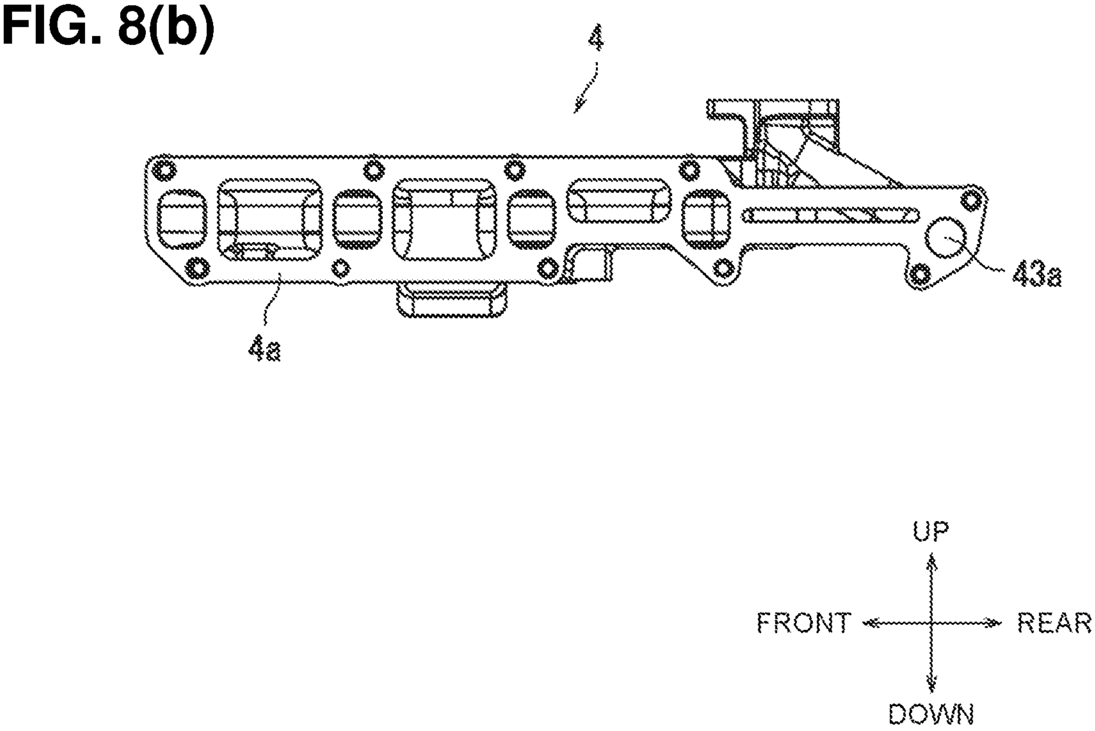

Next, the engine device 100 according to the present embodiment is described with reference to FIGS. 8(*a*), 8(*b*), 9(*a*) and 9(*b*). FIG. 8(*a*) is a perspective view showing the exhaust manifold 4. FIG. 8(*b*) is a right side view of the exhaust manifold 4.

As shown in FIG. 8(*a*), the flange 42 of the exhaust manifold 4 has an EGR gas outlet 42*a* and an EGR gas inlet 42*b*. The EGR gas outlet 42*a* and the EGR gas inlet 42*b* are arranged side by side in the left-right direction.

The flange 42 of the exhaust manifold 4 has a gas flow path that communicates the gas flow path inside a body 41 with the EGR gas outlet 42*a*. Therefore, the EGR gas outlet 42*a* communicates with the gas flow path in the body 41 of the exhaust manifold 4. EGR gas is discharged from the EGR gas outlet 42*a* and flows into the EGR cooler 6.

The flange 42 of the exhaust manifold 4 has a gas flow path through which the EGR gas inlet 42*b* communicates with the pipe section 43. Therefore, the EGR gas inlet 42*b* communicates with the pipe section 43. After flowing into the flange 42 from the EGR gas inlet 42*b*, the EGR gas after being cooled flows into the gas flow path 20*b* of the cylinder head 20 described with reference to FIG. 6 via the pipe section 43.

As shown in FIG. 8(*b*), the exhaust manifold 4 has a right side surface 4*a*. The right side surface 4*a* of the exhaust manifold 4 faces the left side surface 20*a* of the cylinder head 20 described with reference to FIG. 6. The right side surface 4*a* of the exhaust manifold 4 has an EGR gas outlet 43*a* (opening). The EGR gas outlet 43*a* is an exit of the pipe section 43. The EGR gas outlet 43*a* communicates with the gas flow path 20*b* of the cylinder head 20 described with reference to FIG. 6. The EGR gas after being cooled flows into the gas flow path 20*b* of the cylinder head 20 via the EGR gas outlet 43*a*.

Figure 9A:
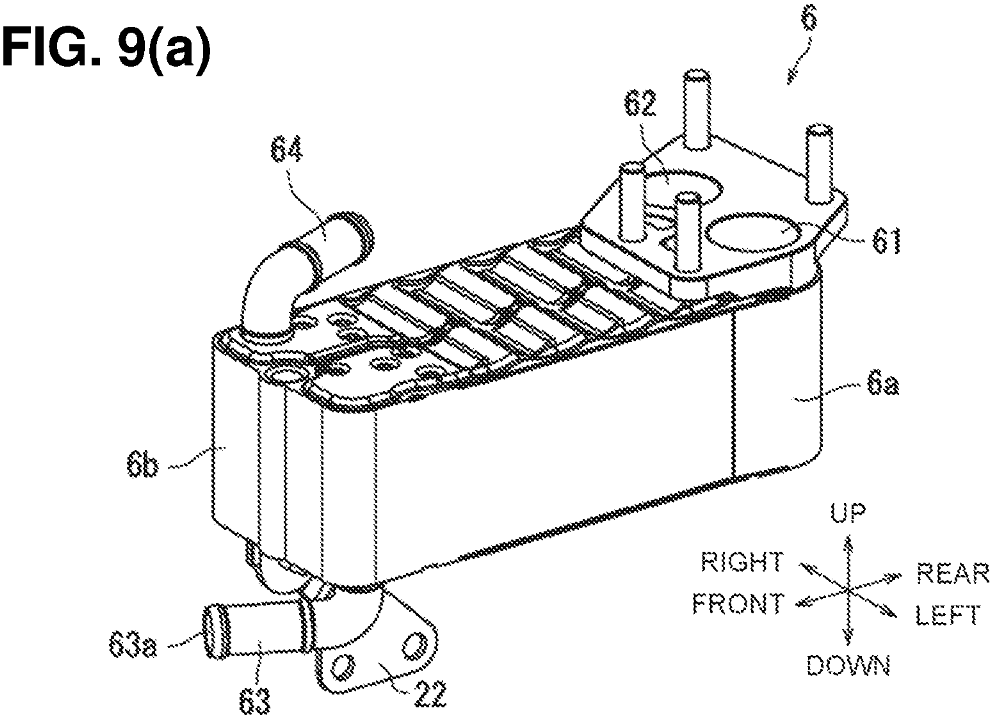
FIG. 9(*a*) is a perspective view showing the EGR cooler.
Figure 9B:
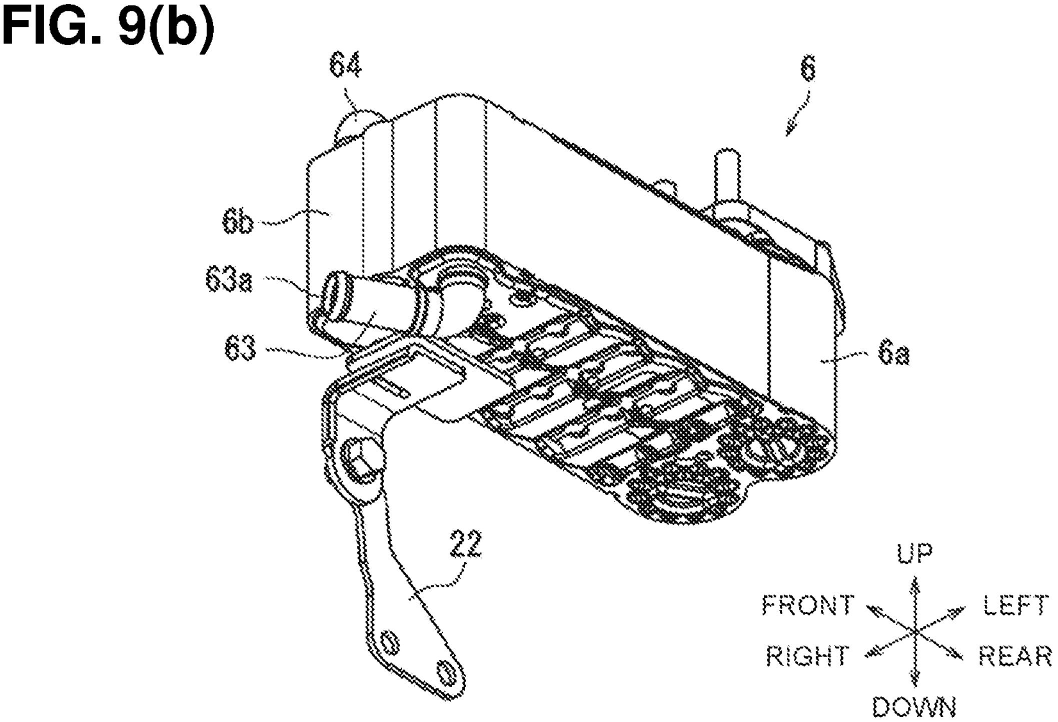

FIG. 9(*a*) is a perspective view showing the EGR cooler 6. FIG. 9(*b*) is another perspective view of the EGR cooler 6. As shown in FIG. 9(*a*), the EGR cooler 6 has an EGR gas inlet 61 and an EGR gas outlet 62 on its top surface. The EGR gas inlet 61 and the EGR gas outlet 62 are arranged side by side in the left-right direction. The EGR gas inlet 61 and the EGR gas outlet 62 communicate with the gas flow path inside the EGR cooler 6 described with reference to FIG. 1.

The EGR gas inlet 61 communicates with the EGR gas outlet 42*a* of the exhaust manifold 4 described with reference to FIG. 8(*a*). EGR gas flows into the EGR gas inlet 61 from the EGR gas outlet 42*a* of the exhaust manifold 4. As a result, EGR gas flows into the gas flow path inside the EGR cooler 6.

The EGR gas outlet 62 communicates with the EGR gas inlet 42*b* of the exhaust manifold 4 described with reference to FIG. 8(*a*). EGR gas after being cooled flows out from the EGR gas outlet 62. As a result, the EGR gas after being cooled flows into the EGR gas inlet 42*b* of the exhaust manifold 4 from the EGR gas outlet 62.

In the present embodiment, the EGR gas inlet 61 and the EGR gas outlet 62 are provided at one end 6*a* of the EGR cooler 6. One end 6*a* of the EGR cooler 6 is one end of the EGR cooler 6 in the longitudinal (front-rear) direction. One end 6*a* of the EGR cooler 6 is attached to the flange 42 of the exhaust manifold 4 (see FIG. 8(*a*)).

As shown in FIGS. 9(*a*) and 9(*b*), the EGR cooler 6 has a cooling water inlet pipe 63 and a cooling water outlet pipe 64. The cooling water inlet pipe 63 has a cooling water inlet 63*a* at its tip end. Similarly, the cooling water outlet pipe 64 has a cooling water outlet (not shown) at its tip end. The cooling water inlet pipe 63 and the cooling water outlet pipe 64 communicate with the cooling water flow path inside the EGR cooler 6 described with reference to FIG. 1.

The cooling water inlet pipe 63 communicates with the first cooling water pipe 8*a* described with reference to FIG. 1. Cooling water flows into the cooling water inlet pipe 63 from the first cooling water pipe 8*a* via the cooling water inlet 63*a*. As a result, cooling water flows into the cooling water flow path inside the EGR cooler 6 described with reference to FIG. 1 via the cooling water inlet pipe 63.

The cooling water outlet pipe 64 communicates with the second cooling water pipe 8*b* described with reference to FIG. 1. Cooling water flows out into the cooling water outlet pipe 64 from the cooling water flow path inside the EGR cooler 6 described with reference to FIG. 1. As a result, cooling water flows out into the second cooling water pipe 8*b* via the cooling water outlet of the cooling water outlet pipe 64.

In the present embodiment, the cooling water inlet pipe 63 (cooling water inlet 63*a*) and the cooling water outlet pipe 64 (cooling water outlet) are provided at the other end 6*b* of the EGR cooler 6. The other end 6*b* of the EGR cooler 6 is the other end of the EGR cooler 6 in the longitudinal (front-rear) direction. In other words, the other end 6*b* of the EGR cooler 6 is opposite side to the one end 6*a* of the EGR cooler 6.

According to the present embodiment, the EGR gas inlet 61 and the EGR gas outlet 62 are provided at one end 6*a* of the EGR cooler 6, and the cooling water inlet pipe 63 (cooling water inlet 63*a*) and the cooling water outlet pipe 64 (cooling water outlet) are provided at the other end 6*b* of the EGR cooler 6. Therefore, since the pipe section for EGR gas (in the present embodiment, the flange 42 of the exhaust manifold 4) connected to the EGR cooler 6 has only to be connected to one end side of the EGR cooler 6, and the pipe section for cooling water (in the present embodiment, the first cooling water pipe 8*a* and the second cooling water pipe 8*b*) connected to the EGR cooler 6 has only to be connected to the other end side of the EGR cooler 6, this makes it possible to improve the degree of freedom in the layout of other parts to be located on the left side (exhaust side) of the engine device 100.

Next, the engine device 100 according to the present embodiment is further described with reference to FIG. 9(*b*). As shown in FIG. 9(*b*), the bracket 22 is connected to the EGR cooler 6 at a side nearer the other end 6*b* (front side) than one end 6*a* of the EGR cooler 6. In other words, the EGR cooler 6 is connected to the flange 42 of the exhaust manifold 4 at one end side (rear side), and it is connected to the bracket 22 at a side nearer the other end (front side) than a point where the EGR cooler is connected to the exhaust manifold 4. As a result, the bracket 22 allows a shake of the EGR cooler 6 due to engine vibration to be suppressed. In the present embodiment, the bracket 22 is connected to the other end 6*b* of the EGR cooler 6. Therefore, this makes it possible to further suppress a shake of the EGR cooler 6 due to engine vibration.

The embodiments of the present invention have been described with reference to the accompanying drawings (FIGS. 1 to 9(*b*)). However, the present invention is not limited to the embodiments described above, and can be carried out in various aspects in a range without departing from its spirit. Further, a plurality of components disclosed in the above-mentioned embodiments can be modified as appropriate. For example, one component included in all components described in one embodiment may be added to components of another embodiment, or some components included in all components described in one embodiment may be omitted from another embodiment.

The drawings schematically show each component as a main subject as so to facilitate understanding of the invention, and the thickness, length, quantity, spacing, and the like of each shown component may be different from the actual ones due to the convenience of creating the drawings. Further, the configuration of each component in the above-described embodiments is merely one example, and the present invention is not limited thereto. It is needless to say that the configuration can be variously altered within a scope not substantially departing from effects of the present invention.

For example, in the embodiments described with reference to FIGS. 1 through 9(*b*), the bracket 22 is connected to the other end 6*b* of the EGR cooler 6, but a position where the bracket 22 is connected to the EGR cooler 6 is not limited to the other end 6*b* of EGR cooler 6. The position where the bracket 22 is connected to the EGR cooler 6 has only to be on a side nearer the other end 6*b* than one end 6*a* of the EGR cooler 6 in the front-rear direction. That is, the bracket 22 has only to be connected to the EGR cooler 6 at more front side (other end side) than one end 6*a* of the EGR cooler 6.

In the embodiments described with reference to FIGS. 1 through 9(*b*), the bracket 22 is connected to the bottom surface of the EGR cooler 6, but a position where the bracket 22 is connected to the EGR cooler 6 is not limited to the bottom surface of the EGR cooler 6. The bracket 22 may be connected to the top surface of the EGR cooler 6 or to the front surface of the EGR cooler 6.

INDUSTRIAL APPLICABILITY

The present invention is useful for an engine device.

DESCRIPTION OF REFERENCE NUMERALS

2: Cylinder block
2*a*: Side surface
4: Exhaust manifold
6: EGR cooler
6*a*: One end
6*b*: The other end
10: Starter
12: Flywheel housing
20: Cylinder head
20*a*: Left side surface
22: Bracket
24: Crankshaft
26: Flywheel
61: EGR gas inlet
62: EGR gas outlet
63: Cooling water inlet pipe
63*a*: Cooling water inlet
64: Cooling water outlet pipe
100: Engine device

The invention claimed is:

1. An engine device comprising:
a cylinder block;
a cylinder head located above the cylinder block;
an exhaust manifold, located on one side surface of the cylinder head to distribute exhaust gases exhausted from the cylinder head and, and having a pipe section;
an EGR gas inlet connected to the cylinder head via the pipe section of the exhaust manifold; and
an EGR cooler,
fixed to a side surface of the cylinder block at a bottom surface of the EGR cooler and
located below the exhaust manifold to cool EGR gas that is part of the exhaust gases exhausted from the exhaust manifold, and
extended along a longitudinal direction of the exhaust manifold and located within a length of the exhaust manifold.

2. The engine device according to claim 1, wherein the EGR cooler is attached to the exhaust manifold.

3. The engine device according to claim 1, further comprising:
a bracket, located at the bottom surface of the EGR cooler, wherein the bottom surface is located opposite from a top surface of the EGR cooler, the top surface facing the exhaust manifold, to attach the EGR cooler to the side surface of the cylinder block.

4. The engine device according to claim 3, wherein the EGR cooler is connected to the exhaust manifold on one end side of the EGR cooler and is connected to the bracket on a side nearer the other end of the EGR cooler than a point where the EGR cooler is connected to the exhaust manifold.

5. The engine device according to claim 4, wherein the EGR cooler includes a gas inlet through which the EGR gas flows in, a gas outlet through which the EGR gas flows out, a cooling water inlet through which cooling water flows in, and a cooling water outlet through which the cooling water flows out, the gas inlet and the gas outlet are provided at one end of the EGR cooler, and the cooling water inlet and the cooling water outlet are provided at the other end opposite to the one end of the EGR cooler.

6. The engine device according to claim 1, further comprising:
a crankshaft rotatably supported by the cylinder block;
a flywheel rotating integrally with the crankshaft; and
a flywheel housing to house the flywheel, wherein a center of the EGR cooler in an axial direction along which the crankshaft extends is positioned on a side nearer the flywheel housing than a center of the cylinder block in the axial direction.

7. The engine device according to claim 6, wherein the EGR cooler is located at a position adjacent to the flywheel housing.

8. The engine device according to claim 6, wherein entirety of the EGR cooler overlaps the flywheel housing as viewed from a side of the flywheel housing.

9. The engine device according to claim 6, further comprising:
a starter to transmit rotational power to the flywheel at engine startup, wherein the starter is attached to the flywheel housing and the EGR cooler is located above the starter.

10. The engine device according to claim 1, wherein the EGR cooler overlaps the exhaust manifold as viewed from an upper side.

11. The engine device according to claim 1, wherein the EGR cooler is directly connected to the exhaust manifold to flow the EGR gas without going through a pipe.

12. An engine device comprising:
a cylinder block;
a cylinder head located above the cylinder block;
an exhaust manifold located on one side surface of the cylinder head to distribute exhaust gases exhausted from the cylinder head; and
an EGR cooler,
located below the exhaust manifold to cool EGR gas that is part of the exhaust gases exhausted from the exhaust manifold,
fixed to a side surface of the cylinder block by a bracket which is located at a bottom surface of the EGR cooler, wherein the bottom surface is located opposite from a top surface of the EGR cooler, the top surface facing the exhaust manifold, and
extended along a longitudinal direction of the exhaust manifold and located within a length of the exhaust manifold.

* * * * *